MAGNETIC MEMORY CIRCUIT ACHIEVING REPERTORY DIALER OPERATION WITH DOMAIN PROPAGATION MEDIA

Filed June 1, 1966 5 Sheets-Sheet 1

INVENTORS U.F. GIANOLA
R.A. KAENEL
J.L. SMITH
BY Herbert M. Shapiro
ATTORNEY

Dec. 2, 1969 U. F. GIANOLA ET AL 3,482,224

MAGNETIC MEMORY CIRCUIT ACHIEVING REPERTORY DIALER OPERATION WITH DOMAIN PROPAGATION MEDIA

Filed June 1, 1966 5 Sheets-Sheet 2

United States Patent Office 3,482,224

Patented Dec. 2, 1969

3,482,224

MAGNETIC MEMORY CIRCUIT ACHIEVING REPERTORY DIALER OPERATION WITH DOMAIN PROPAGATION MEDIA

Umberto F. Gianola, Florham Park, Reginald A. Kaenel, Chatham, and James L. Smith, Bedminster, N.J., assignors to Bell Telephone Laboratories, Incorporated, Murray Hill and Berkeley Heights, N.J., a corporation of New York Filed June 1, 1966, Ser. No. 554,378

Int. Cl. G11b *5/00;* H04m *1/26*

U.S. Cl. 340—174 15 Claims

ABSTRACT OF THE DISCLOSURE

Repertory dialer operation is achieved with domain propagation media by adding index information selectively to tag storage positions. Information is moved through the media to operation positions for storing and for reading information under the control of the index information.

This invention relates to information storage arrangements and, more particularly, to such arrangements employing magnetic media.

Frequently it is required to store information words in a medium and to retrieve those words selectively as is well known. A repertory dialer is one arrangement which uses such a word-organization to advantage and this invention will be described illustratively in terms of such a repertory dialer.

A repertory dialer, as is well known, is a piece of telephone apparatus in which frequently called telephone numbers are stored as corresponding information words which are selectively read out for providing corresponding numbers of dial pulses at the command of the subscriber. Each word stored therein, then, constitutes an indication of a particular telephone number to be dialed automatically when the subscriber reads the corresponding word out of memory. Selective (nondestructive) readout is necessary to permit such dialing of a desired number.

At the present time, information is stored in repertory dialers, for example, as coded apertures on cards. A particular card is selected by the subscriber and pressed into a mating holder. The apertures operate electromechanical apparatus for dialing a corresponding telephone number. Such card dialers have the shortcomings typical of mechanical systems and, in addition, present a substantial retrieval problem themselves when the number of cards becomes large.

Magnetic tapes are also used in repertory dialers. Such tapes store information, in parallel, transverse to the axis of the tape along with mechanical data indicating the address of the information. A particular "number" is selected by indicating the address which includes the desired number and by physically moving the tape until the corresponding address appears for providing an address match. The advance means for so moving the tape is mechanical and is again attended by all the disadvantages associated with mechanical devices. Moreover, the circuitry for enabling the readout of corresponding number information is relatively complicated.

An object of this invention is to provide a new and novel repertory dialer.

Another object of this invention is to provide a new and novel information storage and retrieval arrangement.

The foregoing and further objects of this invention are realized in one embodiment thereof wherein a plurality of telephone number representations are stored as reverse (magnetized) domain patterns in a continuous magnetic medium, illustratively a single domain wall wire. The subscriber selects a particular representation for dialing by depressing a number-select button (in the telephone subset) which stores an index reverse domain at a selected index position in a second domain wall wire. All reverse domains stored in the two wires are stepped simultaneously toward an output position. When the index domain in the second wire arrives at an output position, it enables an output means which responds to the passage thereby of the reverse domains in the corresponding number representation in the first wire to provide output pulses indicative of that representation. Once the output is provided, that is to say, once the desired number is dialed, the reverse domains in the first wire are returned to their home positions. Means are provided to erase previously stored index domains in the second wire prior to providing a new index domain. Information is written into the wire in a similar manner except that a stored number representation is erased and a new one written before reverse domains are returned to their home positions.

Accordingly, a feature of this invention is an information storage and retrieval arrangement including first and second domain wall wires, means for storing number representations in prescribed positions in the first wire, means for storing an index indication in a selected position of the second wire, means for moving the number representations and the index indication in a first or second direction through the wires, and means responsive to the index representation for reading out the corresponding number representation.

Another feature of this invention is an information storage and retrieval arrangement including means storing information in prescribed positions in a storage medium, means defining index positions corresponding to those prescribed positions, means providing an index indication at a selected index position, and means responsive to the index indication for operation on (that is, reading out or erasing and writing in) information in the corresponding one of the prescribed positions.

For reference, a domain wall medium is a medium comprising a magnetic material in which reverse domains are provided in response to a first field in excess of a nucleation threshold and through which reverse domains are propagated in response to second fields in excess of a propagation threshold and less than the nucleation threshold. Such media are usually operated such that a first field, termed a nucleation field, is applied over a limited input portion of the medium. Thereafter, the second fields, termed propagation fields, are applied in consecutive limited portions to advance the reverse domains along the medium to a spaced apart output position. Such operation is described in K. D. Broadbent Patent No. 2,919,432, issued Dec. 29, 1959.

The foregoing and further objects and features of this invention will be understood more fully from the following detailed discussion thereof rendered in conjunction with the accompanying drawing, in which.

Figure 1:
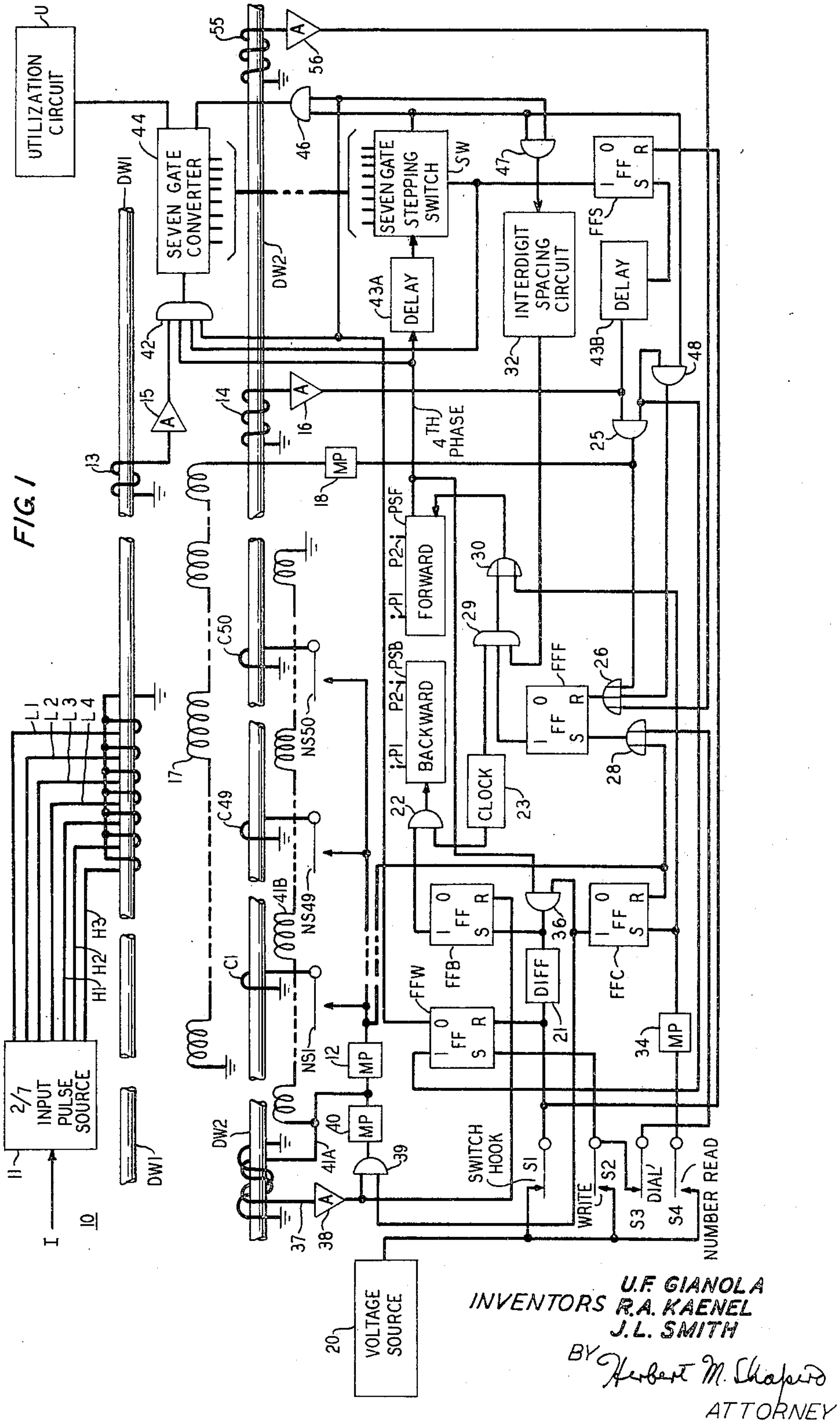
FIG. 1 is a schematic representation of a repertory dialer in accordance with this invention.

Specifically, FIG. 1 shows a repertory dialer 10 in accordance with this invention. The repertory dialer, as has been stated above, functions to store "dialed" telephone numbers and to "dial" prestored telephone numbers in response to coded signals under the control of a subscriber. The subscriber subset is not shown herein but is indicated in FIG. 1 generally by a block designated coded two-out-of-seven (2/7) input pulse source 11 and an input I thereto. Such an input may be generated, for example, with signals from a pushbutton subset as is well known.

The dialer 10 includes a magnetic domain wall wire DW1 in which coded representations of telephone numbers are stored. Illustratively, seven input conductors couple the domain wall wire DW1 and are shown in FIG. 1 connected between pulse source 11 and ground. The seven conductors are designated L1, L2, L3, L4, H1, H2, and H3 to correspond to the accepted designations for the (Low and High) multifrequencies associated with a pushbutton subset. Thus it is clear that the depression of a digit-select button at a subscriber subset corresponds to the activation of a coded pair of the seven input conductors. Of course, subsets of the type useful in accordance with this invention include apparatus for visually representing a plurality of telephone numbers with corresponding number-select buttons designated. Such an apparatus is known and its use herein is supplementary to and not a part of this invention as would be apparent to one skilled in the art. The number-select buttons, however, are a part of this invention to the extent that they determine which position in wire DW1 includes the telephone number representation selected for a readout or for an erase and write-in operation. We will have occasion to describe the operation in response to the depression of a number-select button hereinafter. At this juncture it should be made clear that the seven conductors L1 . . . L4, H1 . . . H3 are the coded input conductors to the repertory dialer and may be selected in response to the closure of contacts in a pushbutton subset when a corresponding digit-select button is depressed. Those conductors couple the domain wall wire DW1 and effect, illustratively, coded reverse domain patterns therein when pulsed in coded pairs by pulse source 11.

Figure 2:
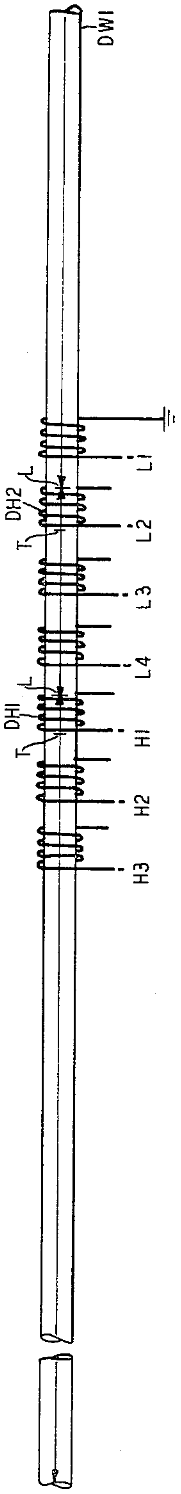
FIGS. 2 through 4 are schematic representations of portions of the repertory dialer of FIG. 1 showing the disposition of information therein during operation.

It is important for a complete understanding of this invention that the representation and movement of information in a domain wall wire be fully understood. Accordingly, a brief description of such a representation and movement is provided now. Specifically, information is stored in a domain wall wire as reverse domains. For example, FIG. 2 shows reverse domains as arrows directed to the right as viewed and bounded by leading and trailing domain walls represented by vertical lines designated L and T respectively. The wire is assumed initialized to a magnetic condition represented by arrows directed to the left. The domain walls, then, are defined by the interface between a reverse domain and an adjacent initialized portion. The domains are designated by a D followed by the designation of the one of the seven input conductors pulsed for initially generating the domain. Thus the pulsing of conductors L2 and H1 provides domains DL2 and DH1 respectively. The coded disposition of those domains is shown in FIG. 2.

Figure 3:
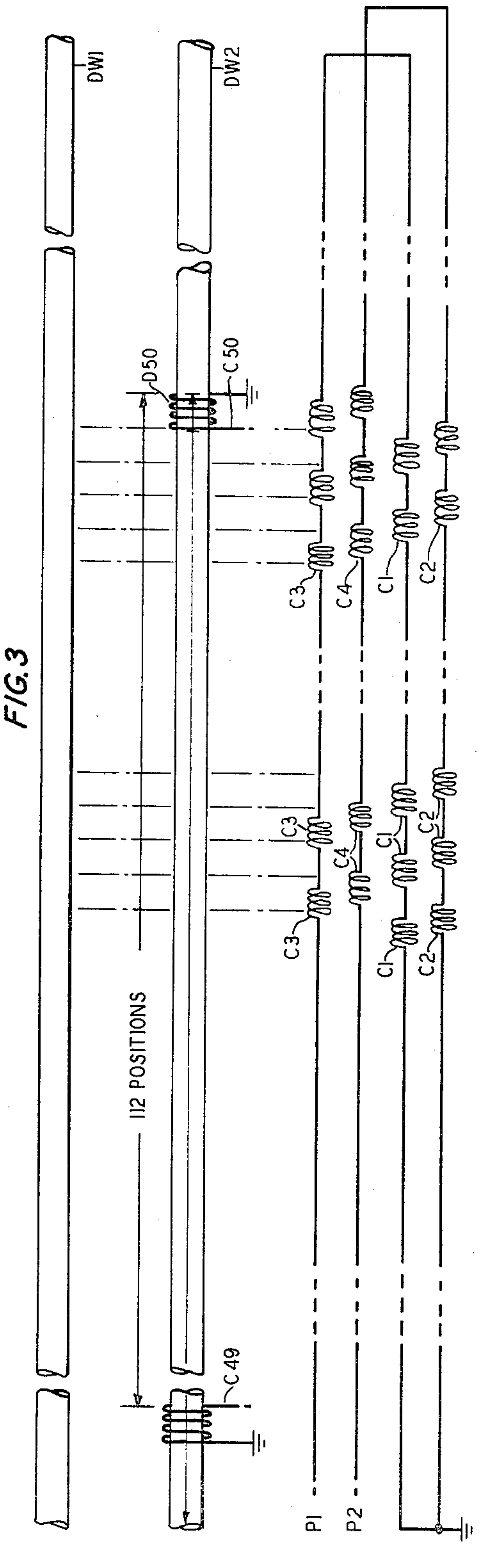

Reverse domains are moved through domain wall wires in a manner which preserves the separation between domains. Such movement is described in the aforementioned Broadbent patent and in copending application Ser. No. 538,736, filed Mar. 30, 1966 for R. F. Fischer, now Patent No. 3,439,352. FIG. 3 shows an illustrative propagation means in accordance with this invention for so moving reverse domains through domain wall wire DW1 and an additional wire DW2 as will become clear. The propagation means comprises a pair of conductors P1 and P2 which couple interleaved positions along each of the entire domain wall wires. The couplings between conductors P1 and P2 and the domain wall wires are represented as coils C1, C2, C3, and C4 spaced apart from the wires in FIG. 3 for clarity. Each set of coils C1, C2, C3, and C4 defines a (bit) position along wires DW1 and DW2. The various input and other conductors illustratively couple wires DW1 and DW2 along portions of (bit) positions also coupled by coils C3 and C4 unless otherwise specified.

The conductors P1 and P2 are connected between a propagation pulse source shown in FIG. 1 as two blocks PSF and PSB, labeled forward and backward respectively, and ground. The pulse source illustratively provides the now well known four-phase propagation pulse sequence, +P1, +P2, −P1, −P2. In this manner information stored in wires DW1 and DW2 is moved in first and second directions. The propagation pulse source is represented as two blocks in FIG. 1 to show that two separate pulse sources may be used for forward and backward movement of reverse domains. In practice, it is convenient to use a single source and to alter the pulse sequence to provide the forward and backward movement. The propagation pulses, in either case, are applied conveniently to the same propagation conductors and those conductors, thus, are shown connected to each of blocks PSF and PSB in FIG. 1. Next adjacent reverse domains are positioned four phases (one propagation sequence) apart.

The domains DL2 and DH1, shown in FIG. 2, are provided in response to the depression of a digit-select button. Accordingly, those domains correspond to a decimal digit of a telephone number. A telephone number, then, is stored as a plurality of coded domain pairs stored consecutively in the domain wall wire in response to the depression of consecutive digit-select buttons corresponding to the called number. Each coded domain pair is stored and then moved to the right, as viewed, seven positions to clear the portion of wire DW1 coupled by the seven coded conductors before the next digit-select button is depressed for the next susbequent input.

Figure 4:
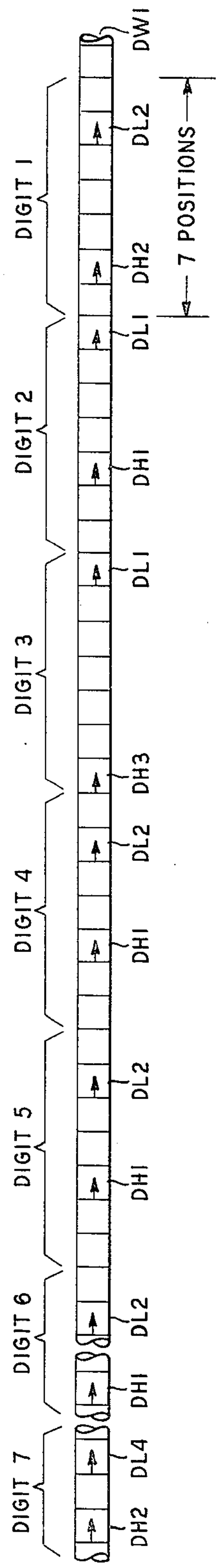

Consider a representative local telephone number 5134440 dialed and stored in the above manner. Wire DW1, then, includes the pattern of reverse domains DL2–DH2, DL1–DH1, DL1–DH3, DL2–DH1, DL2–DH1, DL2–DH1, and DL4–DH2 reading from right to left as shown in FIG. 4. The correspondence between the telephone number and the coded domain pairs is explained further in connection with the pushbutton dial shown in FIG. 5 during the discussion of the storage and retrieval of that number hereinafter.

FIGS. 1 and 3 also show an additional domain wall wire DW2. Illustratively, the conductors P1 and P2 shown in FIG. 3 couple wire DW2, as well as wire DW1, such that reverse domains in wire DW2 move as do domains in wire DW1 when the conductors are pulsed. The seven input conductors L1 . . . L4 and H1 . . . H3 do not couple wire DW2.

Wire DW2 is coupled by a plurality of conductors C1 through C50 each connected between a number-select switch, correspondingly designated NS1 through NS50, and ground as represented in FIG. 1. Conductors C1 through C50 are spaced apart sixteen digit representations, each of seven positions, along wire DW2 as shown in FIG. 3 for a two-out-of-seven code. Such spacing is to permit the storage of a maximum telephone number representation in corresponding position of wire DW1. Thus a conductor C50 corresponds in position to the position of a reverse domain DL1 in a first digit of a telephone number representation, conveniently one position to the right thereof as viewed. The next conductor C49 similarly corresponds to a domain DL1 of a first digit of a second number representation. The assumed maximum number of digits in an acceptable telephone number is sixteen. Thus, conductors C50 and C49 are spaced apart illustratively 112 positions along wire DW1 permitting the storage of any acceptable telephone number therebetween. It is to be appreciated that some liberties have been taken in the representations of the various couplings to the two wires DW1 and DW2.

Let us assume, for the moment, that fifty telephone numbers are already stored in domain wall wire DW1 and that each one of those numbers is represented in a manner similar to that shown in FIG. 4. Each such number, then, is normally in a "home" position along wire DW1 corresponding to an index position defined by a corresponding conductor C1 through C50. Since the number represented in FIG. 4 is a local number, only seven digits, each occupying seven positions, are used. Yet 112 positions are still allocated for each number representation.

A subscriber selects a particular number by depressing a number-select button on his subset. Those number-select buttons, not shown, correspond to the switches NS1 through NS50 shown in FIG. 1. The depression of a particular number-select button, say the button (NB50) corresponding to switch NS50, closes switch NS50. Each of conductors C1 through C50 is connected to a monopulser 12. Thus when switch NS50 is closed and monopulser 12 is triggered, a reverse domain D50 is nucleated in wire DW2 (FIG. 3) at the position therealong coupled by conductor C50. The domain D50 serves as an index indication of the telephone number representation stored at the corresponding home position which we may refer to as home position H50.

All the home positions in wire DW1 are illustratively to the left of an output position along wire DW1 coupled by a sense conductor 13 as shown in FIG. 1. Conductor 13 couples wire DW1 at a position spaced apart typically one position from that coupled by the nearest of the coded input conductors. A sense conductor 14 couples the position of wire DW2 illustratively corresponding to the position in wire DW1 coupled by conductor 13. Conductors 13 and 14 are connected between amplifiers 15 and 16, respectively, and ground as shown in FIG. 1. When the index domain (indication) D50 is nucleated in response to the depression of the number-select button NB50, reverse domains are stepped to the right concurrently in both wires by propagation pulses applied to conductors P1 and P2. This operation is described further hereinafter. The reverse domains advance until the index domain D50 reaches sense conductor 14 inducing a pulse therein. That pulse operates, during a read operation, to enable the detection of the representation stored in the corresponding home position H50, via sense conductor 13, in a manner to be described more fully. In the absence of the index domain D50 the pulses induced by the corresponding representation in wire DW1 are ignored.

A conductor 17 is shown in FIG. 1 just below the representation of wire DW1 there. That portion of wire DW1 coupled by conductor 17 includes the portion also coupled by the seven input conductors L1 through L4 and H1 through H3. Conductor 17 is connected between a monopulser 18 and ground. During a write operation, information is advanced toward the sense conductors as described for a read operation. When an index domain reaches conductor 14 and induces a pulse therein, the circuit of FIG. 1 responds to trigger monopulser 18 which, in turn, pulses conductor 17 clearing the selected number representation (sixteen digits of seven positions each) from domain wall wire DW1. In addition, the propagation pulses are inhibited and the movement of information is stopped.

Consider the information in home position H50 cleared in the above manner. That portion of home "position" H50 corresponding to the first of sixteen digit positions therein is in position for write-in. The write-in operation proceeds as described hereinbefore, the representation of each digit being stored and advanced seven positions before the next subsequent digit representation is stored. If a local (seven digit) number is stored, the advance of information (to the right as viewed) is in increments of seven positions after each of the digit representations is stored. After the seventh advance of seven positions, the information is returned to the corresponding home position. Only forty-nine (7×7) bit positions are occupied, however; thus bit positions 50 through 112 are unoccupied. Since those bit positions correspond to digit positions eight through sixteen, nothing is stored for those digits.

Now that we have an understanding of the write and read operations of the circuit of FIG. 1 in functional terms and an appreciation of the mechanism for implementing the write-in of information, the representation of that information, and the movement thereof in accordance with this invention, we are in a position to discuss the circuitry of FIG. 1 for controlling those operations for effecting an illustrative repertory dialer operation. Accordingly, we will now discuss the control circuitry in connection with FIG. 1. Thereafter we will discuss the write-in and readout of an illustrative telephone number 5134440 in home position H50 in accordance with this invention.

Specifically in connection with FIG. 1, a plurality of switches are shown to the left as viewed. All operations in accordance with this invention are initiated in response to the depression of buttons on a subscriber subset (not shown). Those buttons control the switches of FIG. 1 and, accordingly, the operation of the switches is described herein as initiating the various operations.

A switch hook switch S1 is shown connected between a voltage source 20 and the reset inputs of "write" and "sense" flip-flops FFW and FFS and between source 20 and the set input of a "backward" flip-flop FFB. The connection to flip-flop FFB is via a differentiator 21. Switch S1 is normally closed and is opened when the subscriber goes off-hook. In the closed condition, the voltage from source 20 resets flip-flops FFW and FFS. When the subscriber goes off-hook, the voltage is removed from those flip-flops. No action is initiated. When the subscriber again goes on-hook, the voltage change sets flip-flop FFB via differentiator 21. The set output of flip-flop FFB is connected to an input of AND circuit 22. Another input of AND circuit 22 is connected to a clock pulse source 23. The output of AND circuit 22, in turn, is connected to backward propagation pulse source PSB. Thus when the subscriber goes on-hook, clock pulses from clock 23 are gated to source PSB for triggering four-phase propagation pulse sequences for moving information to the left (backward) as viewed in FIG. 1.

FIG. 1 also shows a "write" switch S2. The write switch is normally open and is closed in response to the depression of a "write" button (not shown) in a subscriber subset for initiating a write operation. Write switch S2 is connected between voltage source 20 and the set input of write flip-flop FFW. The set output of flip-flop FFW is connected to an input of an AND circuit 25. Sense conductor 14 is also connected to an input of AND circuit 25, via amplifier 16. The output of AND circuit 25, in turn, is connected via monopulser 18 to conductor 17 coupled to wire DW1 for a length of that wire in which a complete telephone number, illustratively sixteen digits, is stored. Thus when write switch S2 is closed, flip-flop FFW is set and AND circuit 25 is enabled. Thereafter, at a time when sense conductor 14 is pulsed by the passage of an index domain, monopulser 18 is activated for clearing a selected portion of wire DW1 as described hereinbefore. The output of AND circuit 25 is also connected to an input of an OR circuit 26 the output of which is connected to the reset input of a "forward" flip-flop FFF. Therefore, flip-flop FFF is reset when an index domain induces a pulse in conductor 14 and the write switch S2 is closed. Flip-flop FFF is the forward propagation flip-flop and forward propagation terminates when it is reset. Flip-flop FFF is initially set during a write (or read) operation as is now described in connection with dial and number-read switches S3 and S4, respectively.

A dial switch S3 is also shown in FIG. 1. Switch S3 is normally open and is closed and opened when a digit-select button (not shown) is depressed during a write operation. The dial switch S3 is connected between source 20, via switch S2, and an input to an OR circuit 28. The output of OR circuit 28 is connected to the set input of forward flip-flop FFF. The set output of flip-flop FFF is connected to an input of an AND circuit 29. A second input of AND circuit 29 is connected to clock source 23.

The output of AND circuit 29 is connected to the input of an OR circuit 30. The output of OR circuit 30, in turn, is connected to forward propagation pulse source PSF. Thus each time the dial switch S3 is closed after the write switch is closed, clock pulses from clock source 23 are gated to source PSF for triggering four-phase propagation sequences. The advance is limited to seven propagation sequences in a manner to be described hereinafter. An interdigit spacing circuit 32 is shown connected to an input of AND circuit 29 also. Such a spacing circuit normally provides a voltage level enabling AND circuit 29. Spacing circuit 32 is presumed to supply such a voltage level for the moment. The full operation of such a spacing circuit, however, is described hereinafter.

A number-read switch S4 is also shown in FIG. 1. The number-read switch is connected between voltage source 20 and the input of a monopulser 34. The output of monopulser 34 is connected to the set input of a control flip-flop FFC and an input of OR circuit 30. When a number-select button (not shown) is depressed, switch S4 is closed. Consequently, monopulser 34 sets flip-flop FFC and, in addition, triggers forward propagation pulse source PSF for providing a single propagation pulse sequence. The set output of flip-flop FFC is connected to an input of an AND circuit 36. A "fourth phase" output conductor of forward propagation pulse source PSF, pulsed on the fourth phase of each propagation pulse sequence, is connected to another input of AND circuit 36. In turn, the output of AND circuit 36 is connected to the set input of backward flip-flop FFB. Thus when number-read switch S4 is closed, information moves to the right (forward) one position and then propagates to the left (backward).

A conductor 37 is shown coupled to wire DW2 to the left in FIG. 1. Conductor 37 is connected between an amplifier 38 and ground. Amplifier 38, in turn, is connected to an input to an AND circuit 39 and to the reset input of flip-flop FFB. The set output of flip-flop FFC is also connected to an input of AND circuit 39. The output of AND circuit 39 is connected in turn to a monopulser 40. An output of monopulser 40 is connected to an input of a monopulser 12 and to nucleation and erase conductors 41A and 41B, respectively. Thus when flip-flop FFC is set (during either a read or a write operation) and a reverse domain arrives at the position in wire DW2 coupled by conductor 37, backspacing ceases (flip-flop FFB is reset), a new reverse domain is nucleated in wire DW2 at the position coupled by conductor 41A, and the remainder of wire DW2 is erased (via conductor 41B). That reverse domain provided during this operation is a marker domain serving to properly position information in wire DW2 as will become clear. Thereafter, a new index domain is provided via the selected number-select switch in response to the output of monopulser 12. Information stored in the corresponding position of wire DW1 is now in its home position.

As has been stated hereinbefore, a telephone number is represented illustratively as consecutive coded reverse domain pairs stored in wire DW1 in a home position indexed by a reverse domain in a corresponding index positioned in wire DW2 determined by the depression of a selected number-select button. As the reverse domains pass sense conductors 13 and 14 they induce pulses therein operative upon output circuitry herein. Specifically, sense conductor 13 is connected to an input of an AND circuit 42, via amplifier 15. In addition, the "fourth phase" output conductor of forward propagation pulse source PSF, in which the fourth phase pulse appears, is connected to another input of AND circuit 42. The last-mentioned output of forward pulse source PSF also is connected to the input of a seven-stage stepping switch SW via a (one-phase) delay 43A. Sense conductor 14 is connected to the set input of a "sense" flip-flop FFS via a (four-phase) delay 43B. The set output of flip-flop FFS is connected to the input to stepping switch SW and an input to AND circuit 42. The reset output of flip-flop FFW also is connected to an input of AND circuit 42. The output of AND circuit 42 and the seven-stage outputs of stepping switch SW are connected to inputs to a seven-gate converter 44 which operates to convert a coded domain pair to a two-out-of-seven parallel output. An additional output of stepping switch SW is connected to inputs of AND circuits 46 and 47, and to an input of an AND circuit 48. The reset output of the write flip-flop FFW also is connected to inputs of AND circuits 46 and 47, flip-flop FFW being reset during a read operation. The set output of flip-flop FFW is connected to an input of AND circuit 48, flip-flop FFW being set during a write operation. The output of AND circuit 46 is connected to an input of seven-gate converter 44, and the output of AND circuit 47 is connected to an input of interdigit spacing circuit 32. The output of seven-gate converter 44 is connected to a utilization circuit U and the output of AND circuit 48 is connected to an input of OR circuit 26.

As will become clearer hereinafter, flip-flop FFW is in a reset condition only during a read operation. Thus, AND circuits 42, 46, and 47 are enabled only during a read operation. A selected index domain arriving at sense conductor 14 during a read operation, then, induces a pulse therein enabling AND circuit 25 and setting flip-flop FFS via four-phase delay (43B) which readies the stepping switch for operating in correspondence with the first bit of stored information. Specifically, flip-flop FFS resets stepping switch SW and enables AND circuit 42. The domain pairs in the position of wire DW1 corresponding to the selected index domain induce coded pulses in sense conductor 13 activating AND circuit 42. To this end, forward propagation pulse source PSF generates four-phase pulse sequences to advance the reverse domains and every fourth phase pulse enables AND circuit 42. Thus, the presence or absence of a reverse domain in wire DW1 is indicated every fourth propagation pulse via AND circuit 42 for storage in one position of converter 44. Which one of those gate positions of converter 44 is activated for storage is controlled by stepping switch SW. Stepping switch SW is stepped one position after a one-phase delay (43A) following each fourth forward propagation pulse. Thus, seven-gate converter 44 stores an indication of one of the seven positions in a domain pair representation and advances one gate. For the first digit as shown in FIG. 4, converter 44 stores 0100010 corresponding to reverse domains (a "1") in the second (DL2) and sixth (DH2) of seven (DL1, DL2, DL3, DL4, DH1, DH2, and DH3) coded positions. It is clear that sense conductors 13 and 14 are coupled to the portions of corresponding bit positions also coupled by coil C4 of FIG. 3 (the fourth phase) for the illustrative operation.

When stepping switch SW steps through seven positions, the entire digit representation (one coded domain pair) is stored in converter 44. Stepping switch SW then signals converter 44 via AND circuit 46 to provide a parallel output to a utilization circuit U which is, conveniently, a two-out-of-seven to multifrequency code converter. That signal also activates AND circuit 47 driving interdigit spacing circuit 32 to a null condition disabling AND circuit 29 and, consequently, terminating the advance of reverse domains to the right for the (predetermined) duration of that null. The interdigit spacing circuit is conveniently a monopulser.

Stepping switch SW is similarly stepped along during a write operation (when flip-flop FFW is set). No output is provided however. Nevertheless, the signal provided by stepping switch SW each time that switch is in its seventh position activates AND circuit 48 for resetting forward flip-flop FFF terminating the forward advance of reverse domains. Forward advance is initiated during a write operation, each time a digit-select button is depressed closing dial switch S3. In this manner a coded domain pair is stored and advanced seven positions as described.

The various logic circuits, switches, gates, flip-flops, pulse sources, et cetera, may be any such elements capable of operating in accordance with this invention.

The input circuitry, the propagation circuitry, the control circuitry, and the output circuitry of the repertory dialer of FIG. 1 have now been described along with the operation of portions of the dialer in response to the closure of the various switches also shown in FIG. 1. The efficacy of the repertory dialer of FIG. 1 is demonstrated by the storage of a representative telephone number in a selected position in wire DW1 and the automatic dialing of that number at the command of the subscriber. To effect such operations the switches in FIG. 1 are depressed in prescribed sequences resulting in the controlled interleaving of the operations described above. We will now describe a write (storage) and read (automatic dialing) operation of a representative telephone number 5134440 stored in position H50 demonstrating such interleaving of operations. First we will complete the correspondence between the pushbutton dial (digit-select buttons) and the coded domain pair designations employed herein.

Figure 5:
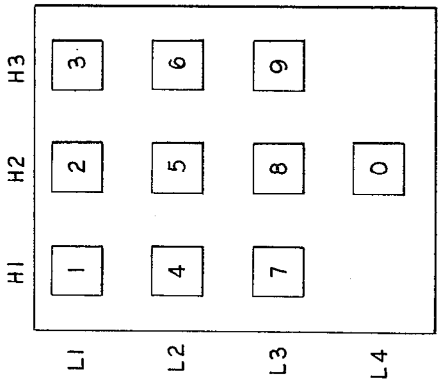
FIG. 5 is a top view of a pushbutton dial compatible with the repertory dialer of FIG. 1.

The usual format of the pushbutton dial is shown in FIG. 5. The pushbuttons are arranged in rows of three, numbered consecutively 1 to 3, 4 to 6, 7 to 9 and designated L1, L2, and L3, respectively. A fourth row, designated L4, includes the "0" button. The columns of buttons are designated H1, H2, and H3. The zero button is in the second column. The designations L and H herein then may be seen to be the coordinates of pushbuttons in such an array. The correspondence between the digit-select buttons depressed by a subscriber and the L1 and H1 designations used for the input conductors and the coded reverse domain pairs herein is complete. The telephone number shown as coded reverse domain pairs (from right to left) in FIG. 4 thus is 5134440.

The subscriber writes (stores) that number into wire DW1 by going off-hook, by depressing the write button, and by next depressing the number-select button corresponding, for example, to the switch NS50 shown in FIG. 1 before depressing the digit-select buttons 5134440 consecutively. The results of the subscriber actions are described in connection with the pulse diagram of the write operation shown in FIG. 6. That diagram also serves as a summary of the operations of the portions of the circuit of FIG. 1 described hereinbefore.

Figure 6:
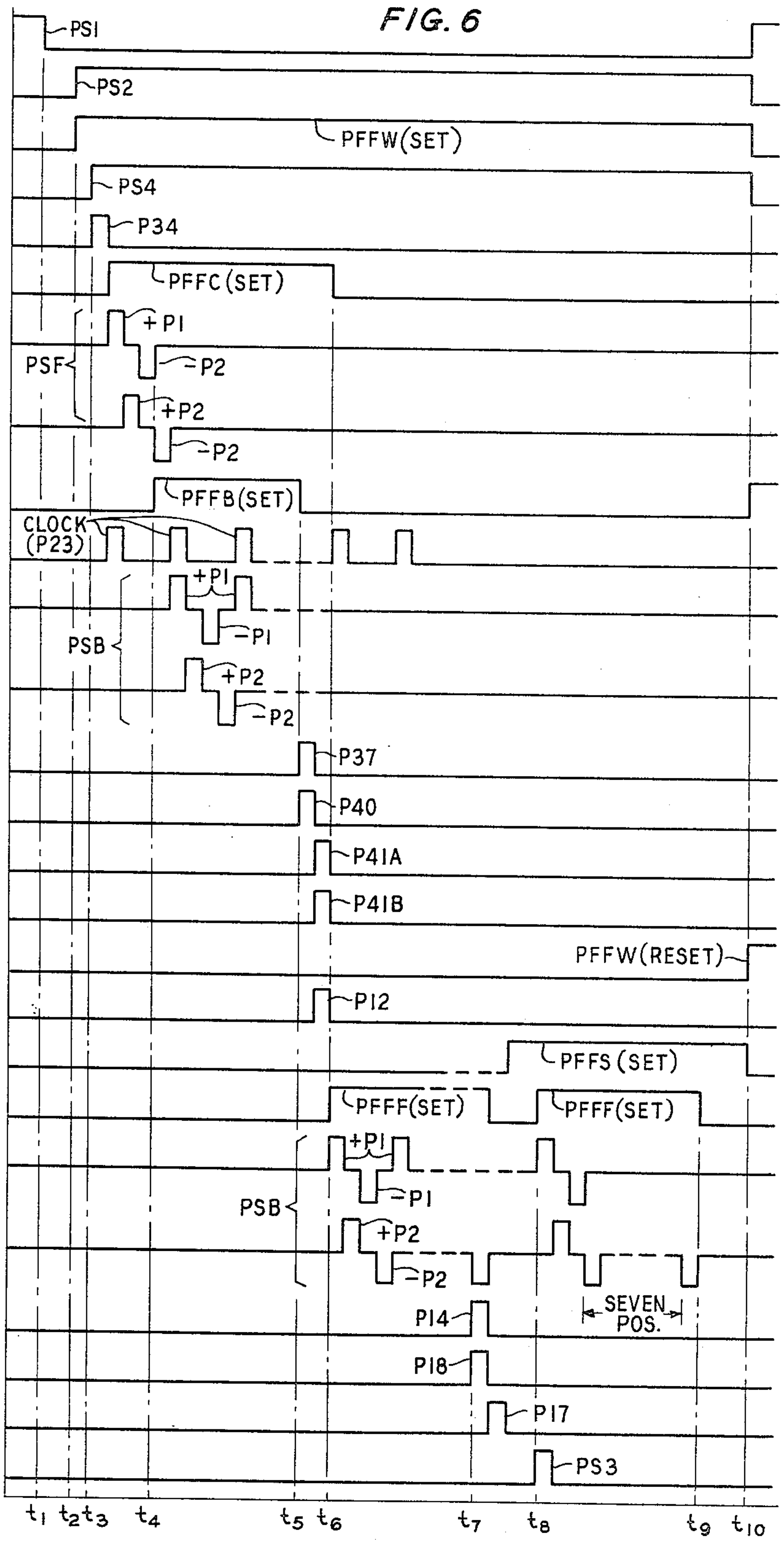
FIGS. 6 and 7 are pulse diagrams of the operation of the repertory dialer of FIG. 1.

The subscriber is assumed to go off-hook at time *t*1 in FIG. 6. Switch S1 opens and the voltage level supplied by source 20 therethrough to reset inputs of flip-flop FFW and FFS terminates. The voltage level is shown as pulse PS1 in FIG. 6. For a write operation, the subscriber next depresses the write button (not shown) closing write switch S2 at a time *t*2. Consequently, the voltage supplied by source 20 is applied to set flip-flop FFW and, via the set output of flip-flop FFW, to enable AND circuits 25 and 48. The voltage is represented by pulse PS2 in FIG. 6. The set output of flip-flop FFW is designated PFFW (set). The number-read switch S4 is closed, via the depression of a number-select button, thereafter at time *t*3 applying a voltage PS4 to monopulser 34. Monopulser 34 provides an output P34 for setting flip-flop FFC thus activating forward pulse source PSF for providing a single four-phase pulse sequence. The set output of flip-flop FFC is designated PFFC (set) in FIG. 6. The four-phase pulse sequence provided by pulse source PSF is shown as pulses +P1, +P2, −P1, and −P2 initiated after time *t*3 in FIG. 6. On the fourth phase of that sequence at time *t*4 when pulse −P2 is applied, AND circuit 36, enabled via flip-flop FFC, is activated and flip-flop FFB is set. The set output of flip-flop FFB, designated PFFB (set) in FIG. 6, operates to gate clock pulses (P23) from clock 23 to backward propagation pulse source PSB for backspacing information.

The one propagation sequence forward is to permit a search for a marker domain at the position along wire DW2 coupled by conductor 37. Such a marker domain is provided in a manner already described and serves to insure proper positioning of information. If the marker domain is not found during the one-phase search, reverse domains are stepped to the left (backward) as described until the marker domain in wire DW2 reaches conductor 37 inducing a pulse P37 therein at a time *t*5 in FIG. 6. Pulse P37 triggers monopulser 40 which, in turn, provides an output P40 which upon terminating pulses conductor 41A (P41A) for "rewriting" the marker domain, pulses erase conductor 41B (P41B) for erasing index domains from wire DW2, and triggers monopulser 12. Monopulser 12 provides a pulse P12 which upon terminating at time *t*6 sets flip-flop FFF. Flip-flop FFF provides an output PFFF (set) for gating clock pulses (P23) to forward pulse source PSF thus stepping information to the right as viewed in FIG. 1. Pulse P12 also resets flip-flop FFC thus preventing back propagation after one forward propagation sequence as already described. The number-select switch NS50 is closed for providing the selected index domain D50 also in response to pulse P12.

Information is now advancing (forward) to the right as viewed in FIG. 1. The index domain (D50) induces a pulse P14 in sense conductor 14 at time *t*7. Pulse P14 activates AND circuit 25, enabled during a write operation by PFFW (set), triggering monopulser 18 (P18) providing a pulse P17 in erase conductor 17. In this manner the telephone number representation in wire DW1 corresponding to the index domain D50 is erased. The pulse P14 also resets flip-flop FFF terminating the forward movement of information. Information is now positioned in wire DW1 such that the depression of consecutive digit-select buttons 5134440 stores corresponding domain pairs as shown in FIG. 4. Each time a digit-select button is depressed, dial switch S3 is closed and opened setting flip-flop FFF for initiating forward advance of information.

The first digit-select button is depressed at time *t*8 in FIG. 6 closing and opening dial switch S3 and providing a pulse PS3. Pulse PS3 sets flip-flop FFF initiating the forward advance of information. The pulse P14 induced in sense conductor 14 by the index domain at time *t*7 already set flip-flop FFS (after a four-phase delay), also, as shown by pulse PFFS (set). The pulse PFFS (set) resets stepping switch SW. Stepping switch SW is advanced one stage by each fourth phase propagation pulse. When stepping switch SW reaches the seventh stage at time *t*9 it provides a signal resetting flip-flop FFF via AND circuit 48 and OR circuit 26. Forward movement of information stops.

The subscriber depresses the digit-select buttons 5134440 in sequence. Each time a digit-select button is depressed, the foregoing operation repeats. For a local number, seven digit positions of seven bit positions each are used. The subscriber then goes on-hook at time *t*10 resetting flip-flops FFW and FFS. In addition, flip-flop FFB is set when the subscriber goes on-hook initiating backward spacing of information until the marker domain reaches conductor 37. Since flip-flop FFC is in the reset state, AND circuit 39 is disabled at this time inhibiting further movement of information as described at time *t*5. The stored information is now properly stored at the corresponding home position H50.

Switches S2 and S4 may be assumed open at time *t*10 also. Lock-out means (not shown) prevents the depression of more than one number-select button at a time.

The operation for reading (automatically dialing) the illustrative number 5134440 is now described. The subscriber automatically dials that number by going off-hook and by next depressing the number-select button NB50. The results of the subscriber actions are described in connection with the pulse diagram of the read operation shown in FIG. 7.

Figure 7:
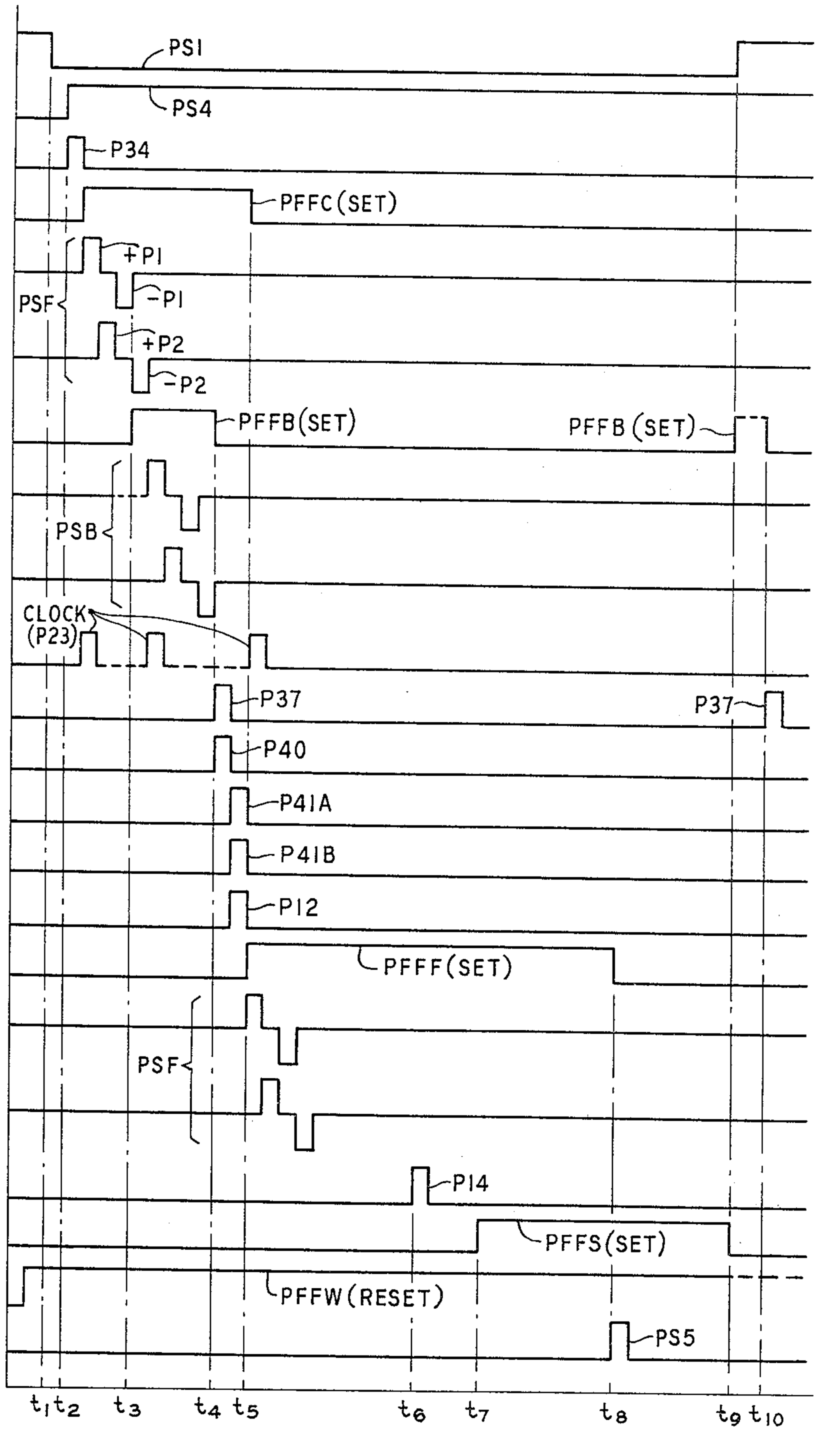

The subscriber is assumed to go off-hook at time $t1$ in FIG. 7 terminating the pulse PS1 applied therethrough to reset flip-flops FFW and FFS. Thereafter, the number-select button (NB50) is depressed. In response, the number-read switch S4 is closed providing a pulse PS4. Pulse PS4 triggers monopulser 34 for applying a pulse P34 for setting flip-flop FFC and for triggering one sequence of four-phase forward advance pulses. This operation is shown at time $t2$ in FIG. 7. The fourth advance pulse —P2 sets flip-flop FFB at time $t3$. Information starts to move backward (to the left) until the marker domain arrives at the position in wire DW2 coupled by conductor 37 at time $t4$ in FIG. 7. Clock pulses P23 insure no overlap of "forward" and "backward" pulses.

The marker domain induces a pulse P37 in conductor 37 triggering monopulser 40, and resetting flip-flop FFB. Monopulser 40 provides a pulse P40 for pulsing (P41A) conductor 41A and for pulsing (P41B) conductor 41B. The pulse P41A provides a marker domain at the position of wire DW2 coupled by conductor 41A (to ensure the presence of the marker). The pulse P41B functions to erase all index domains from wire DW2. In addition pulse P40 triggers monopulser 12 for providing a pulse P12 for nucleating an index domain via the number-select switch NS50, for setting flip-flop FFF, and for resetting flip-flop FFC at time $t5$.

The output PFFF (set) of flip-flop FFF gates clock pulses P23 to forward pulse source PSF for initiating the forward movement of information via four-phase pulse sequences. That forward advance continues, a pulse being provided each fourth phase of the advance for advancing stepping switch SW. This advance of the stepping switch serves no useful purpose until flip-flop FFS is set in response to an index domain passing conductor 14 as will become clear.

At time $t6$ the index domain passes sense conductor 14 providing a pulse P14 therein. That pulse sets flip-flop FFS (via delay 43B). The output PFFS (set) provided by flip-flop FFS is shown initiated at time $t7$ in FIG. 7 and functions to reset stepping switch SW. The forward movement of information continues, each fourth phase propagation pulse stepping stepping switch SW one stage. After stepping switch SW reaches its seventh stage, it provides a signal gating a parallel output from converter 44 to utilization circuit U.

Converter 44 is always in a position corresponding to that of stepping switch SW. Also, when the index domain induces pulse P14 for resetting stepping switch SW, corresponding information is inducing (or not inducing) pulses in sense conductor 13. Thus as each gate position in converter 44 is enabled by stepping switch SW, indications of the corresponding digit representation are stored there. The indications so stored are read out in response to the signal from stepping switch SW after that switch reaches its seventh position. Each coded domain pair is thus stored in converter 44 as a parallel two-out-of-seven code which utilization circuit U conveniently converts to a multifrequency code. For the illustrative number, the output is 0100010, 1000100, 1000001, 0100100, 0100100, 0100100, 0001010, for digits one through seven respectively. The telephone number 5134440 is thus dialed automatically.

Since the illustrative number is a local number only seven digits are dialed. But each number position in wire DW1 occupies sixteen digit positions. After the seven stored digits are dialed, operation continues in the manner described, nothing being stored in converter 44 for the unused digit positions eight through sixteen. Thereafter, the index domain reaches a control conductor 55 connected between an amplifier 56 and ground. Amplifier 56 is connected to an input of OR circuit 26. The output of OR circuit 26 is connected to the reset input of flip-flop FFF. Thus when the index domain reaches conductor 55 it induces a pulse P55 therein for resetting flip-flop FFF and terminating the forward movement of information. This is shown at time $t8$ in FIG. 7. Conductor 55 conveniently couples a fourth phase portion (coil C4) of wire DW2.

When the subscriber later goes on-hook, at time $t9$ in FIG. 7, switch S1 closes and pulse PS1 therethrough resets flip-flop FFW, sets flip-flop FFB, and resets flip-flop FFS. Flip-flop FFW, of course, is already reset (during a read operation). Flip-flop FFB, when set, backspaces information until the marker domain reaches conductor 37, at time $t10$, terminating operation.

Illustratively, domain wall wire DW1 stores fifty telephone numbers each including sixteen digits of seven bit positions each. Therefore, wire DW1 has a length of about fifty six hundred bit positions to either side of the position therealong coupled by sense conductor 13. Domain wall wires are presently operated at a fifty kilocycle rate. It is clear then that information is moved through the wires at rates compatible with the operations described.

The invention has been disclosed in terms of two separate magnetic wires, one containing the stored information and one containing the index indications. In practice it may be more economical to reduce the amount of magnetic wire employed. To this end, index indications may be stored in accordance with this invention on the wire containing the stored information. Such an arrangement is seen to be particularly advantageous when it is realized that for the conversion to a one-out-of-ten coded pulse output many $m$-out-of-$n$ input codes such as the two-out-of-seven code described are represented by reverse domain pairs where the two domains of a pair are never adjacent one another. An index indication may be provided in a single channel (wire) then merely by providing, in addition to the telephone number representation, a pair of adjacent reverse domains to be detected by a suitably positioned AND circuit. Operation is entirely analogous to that described hereinbefore.

The magnetic wires also may be shortened by employing a reentrant operation rather than by the back-spacing of information as disclosed. One appropriate means for providing reentrant operation is disclosed in copending application Ser. No. 507,498, filed Nov. 12, 1965 for J. T. Sibilia and D. H. Smith.

The magnetic wire on which the index indication is stored can be thought of as serving the function of a counter which includes a memory feature built in. Although a second (separate) magnetic wire is disclosed for this purpose, operation in accordance with this invention may be realized alternatively in other media such as in a single film in one or two or more separate propagation channels therein. In such instances when a single film is used for both coded information and index indications, it is convenient to propagate stored information and index indications at the same rate. It is to be understood, however, that when separate media are employed for the stored and index information, propagation need not be at the same rate.

Further, the length of the magnetic wire may be reduced if other $m$-out-of-$n$ codes were used. For example, a two-out-of-five code permits almost a thirty percent saving in register content (length of storage wire). Additional two-out-of-seven to two-out-of-five converters at the input and output of the circuit of FIG. 1 would permit operation substantially as described. The circuit of FIG. 1, of course, is compatible with any $m$-out-of-$n$ code with only straightforward modifications in the input and output thereof.

It is to be understood that what has been described is merely illustrative of this invention and that numerous other arrangements in accordance with the principles of this invention may be devised by one skilled in the art without departing from the spirit and scope thereof.

What is claimed is:

1. A first medium, means for storing coded information in said medium, and propagation means for moving stored information through said medium, in combination with a second medium, means for defining index positions in said second medium corresponding to storage positions for said coded information in said first medium, means for selectively storing index information in said index positions, said propagation means being operative to move index information in said second medium synchronously with the movement of information in said first medium, and means enabled by said index information for providing an output indicative of the information stored in the corresponding storage position of said first medium.

2. A first magnetic medium, means responsive to coded $m$-out-of-$n$ input signals for storing corresponding coded information at storage positions in said medium, a second magnetic medium, means for defining index positions in said second medium corresponding to said storage positions, means for selectively storing index information in one of said index positions, means for moving information through said first and second media synchronously, and means enabled by said index information for providing indications of coded information in the corresponding position in said first medium.

3. In combination, first and second magnetic wires, sensing means coupled to said wires at output positions therein, said sensing means being enabled by the arrival of a reverse domain at said output position in said second wire for detecting the passage of reverse domains past said output position in said first wire, means responsive to coded $m$-out-of-$n$ input signals for storing binary words as corresponding patterns of reverse domains in storage positions in said first wire, means for defining index positions in said second wire corresponding to said storage positions in said first wire, means responsive to a first signal for storing a reverse domain in said second wire in a selected one of said index positions, and means for stepping reverse domains in said first and second wires toward said output positions.

4. A combination including first and second magnetic wires, means for defining a plurality of index positions along said second wire corresponding to home storage positions in said first wire, means for storing an index reverse domain at a selected one of said index positions, first control means coupled to said second wire at a first position, means for moving reverse domains in first and second directions through said wires synchronously, said first control means being enabled by the arrival of an index reverse domain at said first position for positioning reverse domains initially in the home storage position corresponding to said selected one of said index positions at a second position in said first wire.

5. A combination in accordance with claim 4 wherein said first control means is responsive to a first signal and the arrival of an index domain there for erasing reverse domains in said second position.

6. A combination in accordance with claim 5 including means responsive to consecutive coded $m$-out-of-$n$ input signals for storing corresponding consecutive coded reverse domain pairs in said first wire at said second position.

7. A combination in accordance with claim 6 including means for moving stored reverse domains $n$ positions in a first direction in said first and second wires each time a coded reverse domain pair is stored.

8. A combination in accordance with claim 7 including means responsive to a second signal for returning reverse domains in said first and second wires to the index and corresponding home positions.

9. A combination in accordance with claim 4 including second control means coupled to said second wire and responsive to a third signal and the arrival of an index domain there for providing indications of consecutive reverse domain pairs in said first wire at said second position.

10. A combination in accordance with claim 9 including means responsive to the advance of stored reverse domains $n$ positions for inhibiting further advance of information for a prescribed time.

11. A combination in accordance with claim 10 including converter means for storing serially indications of a coded domain pair and for providing a coded $n$ bit parallel output indicative thereof.

12. A combination in accordance with claim 11 including means responsive to a fourth signal for returning reverse domains in said first and second wires to the index and corresponding home positions.

13. A combination including a medium, means for defining a first and a plurality of second positions in said medium, means responsive to coded $m$-out-of-$n$ input signals for selectively storing corresponding coded information in said second positions, means for storing index information at a selected one of said second positions, means for moving coded and index information concurrently in first and second directions through said medium, and readout means responsive to a read signal and enabled by the arrival of said index information at said first position for reading out coded information concurrently moved from said selected second position to said first position.

14. A combination in accordance with claim 13 including write means responsive to the arrival of said index information at said first position for erasing coded information stored then in said first position, and means responsive to a write signal for inhibiting said readout means.

15. A propagation medium, means for defining storage positions in said medium, means for defining an operation position in said medium, means for storing an index indication in a selected one of said storage positions, means for moving said index indication from said selected storage position to said operation position, means enabled by the arrival of said index indication at said operation position and responsive to coded inputs for storing corresponding coded information at said operation position, and means enabled by the arrival of said index indication at said selected storage position for storing said coded information there.

References Cited

UNITED STATES PATENTS

| | | | |
|---|---|---|---|
| 2,953,647 | 9/1960 | Johanson | 179—90 |
| 3,172,089 | 3/1965 | Broadbent | 340—174 |
| 3,207,453 | 9/1965 | Kilburg | 179—90 |
| 3,387,290 | 6/1968 | Snyder | 340—174 |

BERNARD KONICK, Primary Examiner

B. L. HALEY, Assistant Examiner

U.S. Cl. X.R.

179—90